United States Patent
Lee et al.

(10) Patent No.: US 9,461,360 B2
(45) Date of Patent: Oct. 4, 2016

(54) APPARATUS AND METHOD FOR ADJUSTING BEAM PATTERN IN COMMUNICATION SYSTEM SUPPORTING BEAM DIVISION MULTIPLE ACCESS SCHEME

(71) Applicants: Samsung Electronics Co., Ltd., Gyeonggi-do (KR); Korea Advanced Institute Of Science and Technology, Daejeon (KR)

(72) Inventors: Won-Seok Lee, Daejeon (KR); Yong-Hoon Kim, Gyeonggi (KR); Kyoung-Sub Oh, Daejeon (KR); Jong-Won Yu, Daejeon (KR); Sol-Ji Yoo, Daejeon (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 0 days.

(21) Appl. No.: 14/701,117

(22) Filed: Apr. 30, 2015

(65) Prior Publication Data

US 2015/0318610 A1    Nov. 5, 2015

(30) Foreign Application Priority Data

Apr. 30, 2014 (KR) ........................ 10-2014-0052744

(51) Int. Cl.
| | |
|---|---|
| H04L 27/00 | (2006.01) |
| H01Q 3/24 | (2006.01) |
| H01Q 3/34 | (2006.01) |
| H01Q 3/28 | (2006.01) |
| H04L 25/02 | (2006.01) |

(Continued)

(52) U.S. Cl.
CPC .............. *H01Q 3/24* (2013.01); *H01Q 1/1257* (2013.01); *H01Q 1/242* (2013.01); *H01Q 3/26* (2013.01); *H01Q 3/28* (2013.01); *H01Q 3/34* (2013.01); *H01Q 21/06* (2013.01); *H04B 7/0408* (2013.01); *H04B 7/0617* (2013.01); *H04B 17/12* (2015.01); *H04L 25/02* (2013.01); *H04L 25/0278* (2013.01)

(58) Field of Classification Search
CPC ... H04L 1/0618; H04L 1/06; H04L 25/0204; H04L 25/4902; H04L 1/0009; H04L 1/0041; H04L 25/49; H04L 27/2647; H04L 5/0007; H04L 27/2657; H04L 27/2662; H04L 5/0048; H04B 7/0417; H04B 7/0669; H04B 3/54
USPC .................. 375/259, 260, 267, 316, 295
See application file for complete search history.

(56) References Cited

U.S. PATENT DOCUMENTS

| | | |
|---|---|---|
| 5,412,414 A | 5/1995 | Ast et al. |
| 2007/0149146 A1 | 6/2007 | Hwang et al. |

(Continued)

*Primary Examiner* — Zewdu Kassa
(74) *Attorney, Agent, or Firm* — The Farrell Law Firm, P.C.

(57) ABSTRACT

A method for adjusting a beam pattern in a beam pattern adjusting apparatus in a communication system supporting a Beam Division Multiple Access (BDMA) scheme is provided. The method includes determining whether a Voltage Standing Wave Ratio (VSWR) value for each antenna included in an antenna array included in the beam pattern adjusting apparatus is greater than or equal to a threshold VSWR value, if it is determined that an antenna of the antenna array has a VSWR value that is greater than or equal to the threshold VSWR, detecting whether each of the antenna elements is operable, and if it is determined that at least one of the antennas is inoperable, adjusting a beam pattern of at least one of the antennas that is operable.

20 Claims, 10 Drawing Sheets

(51) Int. Cl.
  *H04B 7/04* (2006.01)
  *H01Q 1/12* (2006.01)
  *H01Q 1/24* (2006.01)
  *H01Q 3/26* (2006.01)
  *H01Q 21/06* (2006.01)
  *H04B 7/06* (2006.01)
  *H04B 17/12* (2015.01)

(56) References Cited

U.S. PATENT DOCUMENTS

2012/0051409 A1\* 3/2012 Brobston ............... H03H 7/38
  375/222
2013/0271342 A1\* 10/2013 Shen ............... H04B 1/0458
  343/861

\* cited by examiner

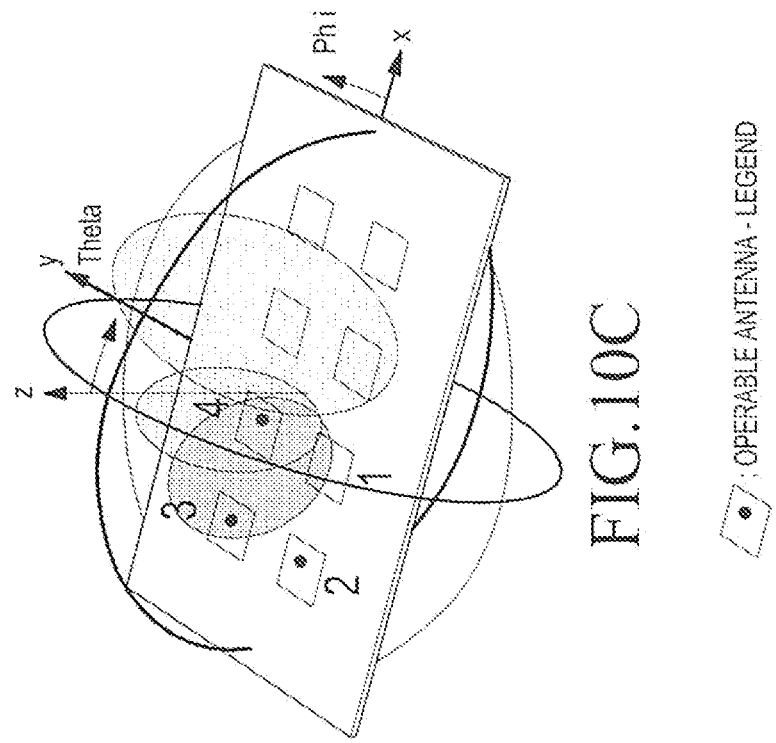
FIG. 10C
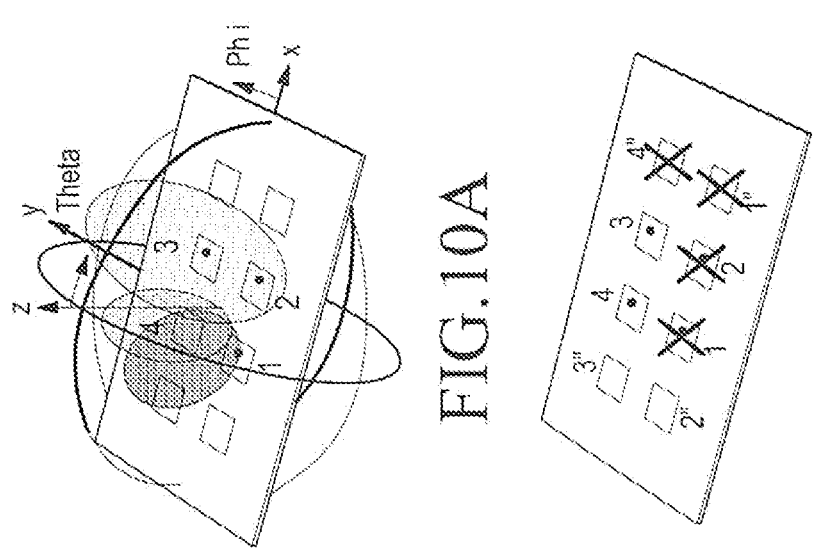
FIG. 10A
FIG. 10B

APPARATUS AND METHOD FOR ADJUSTING BEAM PATTERN IN COMMUNICATION SYSTEM SUPPORTING BEAM DIVISION MULTIPLE ACCESS SCHEME

PRIORITY

This application claims priority under 35 U.S.C. §119(a) to Korean Patent Application Serial No. 10-2014-0052744, which was filed in the Korean Intellectual Property Office on Apr. 30, 2014, the entire disclosure of which is incorporated herein by reference.

BACKGROUND OF THE INVENTION

1. Field of the Invention

The present invention relates generally to an apparatus and method for adjusting a beam pattern in a communication system supporting a Beam Division Multiple Access (BDMA) scheme, and more particularly, to an apparatus and method for adjusting a beam pattern for an array antenna including at least two antenna elements in a communication system supporting a BDMA scheme.

2. Description of the Related Art

Generally, when a user holds a portable terminal in their hand, a characteristic of an antenna used in the portable terminal can change due to an electromagnetic characteristic which is associated with the user's body, such as the hand, head, or other body part of the user's body.

Due to this change of the antenna characteristic, an impedance matching between an antenna side and a system side is not performed for the antenna used in the portable terminal, that is, an impedance mismatch occurs in the antenna used in the portable terminal, which can lead to degradation of communication performance of the portable terminal.

Various schemes for preventing degradation of antenna performance due to impedance mismatching have been proposed, and a typical scheme is an automatic impedance matching scheme.

The automatic impedance matching scheme is a scheme of detecting a Voltage Standing Wave Ratio (VSWR) value which includes a magnitude of a signal and a phase of a signal to automatically match an impedance of an antenna frequency based on the detected VSWR value. Typically, the portable terminal includes a signal detector, a controller, and a variable capacitor. The signal detector detects a VSWR signal which is received through the antenna of the portable terminal, and the controller adjusts a value of the variable capacitor so that the impedance of the antenna frequency becomes an impedance that is matched to a desired transmission/reception frequency.

In the automatic impedance matching scheme, the value of the variable capacitor is adjusted, so the impedance of the antenna frequency in the portable terminal may have an optimized value.

The automatic impedance matching scheme ensures that the impedance of the antenna frequency has an optimized value. However, when the automatic impedance matching scheme is used, the following situations may occur.

First, the human body has an electromagnetic characteristic which changes according to a frequency. More particularly, the human body has an electromagnetic characteristic of a type of dielectric substance in a frequency band which is used in a general portable terminal. However, in a relatively high frequency band, e.g., a frequency band which is greater than or equal to 10 GHz, such as a communication system supporting a BDMA scheme, the human body has an electromagnetic characteristic similar to a conductor.

In a conventional communication system, an impedance change is usually minor, and it is, therefore, possible to perform an impedance matching operation in which an electromagnetic characteristic due to the human body is considered using a variable capacitance, and the like. However, in a relatively high frequency band, e.g., a frequency band which is greater than or equal to 10 GHz, it is difficult to guarantee performance thereof even though the automatic impedance matching scheme is used.

Second, a communication system supporting a BDMA scheme uses an array of antennas in order to increase communication throughput. Generally, the array of antennas, in which a plurality of antenna elements are arranged, is used for increasing directivity, and controls a beam to radiate in a specific direction by adjusting a phase of each antenna element.

However, since the automatic impedance matching scheme targets impedance matching for an individual antenna not impedance matching for a plurality of antenna elements, the automatic impedance matching scheme does not consider various situations that may occur in an array of antennas, e.g., distortion of a beam, and the like.

SUMMARY OF THE INVENTION

The present invention has been made to address at least the above mentioned problems and/or disadvantages and to provide at least the advantages described below.

Accordingly, an aspect of the present invention is to provide an apparatus and method for adjusting a beam pattern in a communication system supporting a BDMA scheme.

Another aspect of the present invention is to provide an apparatus and method for adjusting a beam pattern of an array antenna including at least two antenna elements in a communication system supporting a BDMA scheme.

Another aspect of the present invention is to provide an apparatus and method for adjusting a beam pattern to decrease degradation of beam pattern gain, thereby increasing communication system performance in a communication system supporting a BDMA scheme.

Another aspect of the present invention is to provide an apparatus and method for adjusting a beam pattern to decrease effect of an external factor on an array of antennas, thereby increasing communication system performance in a communication system supporting a BDMA scheme.

Another aspect of the present invention is to provide an apparatus and method for adjusting a beam pattern, thereby increasing a channel capacity in a communication system supporting a BDMA scheme.

Another aspect of the present invention is to provide an apparatus and method for adjusting a beam pattern based on a VSWR signal in a communication system supporting a BDMA scheme.

In accordance with an aspect of the present invention, a method for adjusting a beam pattern in a beam pattern adjusting apparatus in a communication system supporting a BDMA scheme is provided. The method includes determining whether a VSWR value for each antenna included in an antenna array included in the beam pattern adjusting apparatus is greater than or equal to a threshold VSWR value, if it is determined that an antenna of the antenna array has a VSWR value that is greater than or equal to the threshold VSWR, detecting whether each of the antenna elements is operable, and if it is determined that at least one of the antennas is inoperable, adjusting a beam pattern of at least one of the antennas that is operable.

In accordance with an aspect of the present invention, a beam pattern adjusting apparatus in a communication system supporting a BDMA scheme is provided. The beam pattern adjusting apparatus includes a controller configured to determine whether a VSWR value for each antenna included in an antenna array included in the beam pattern adjusting apparatus is greater than or equal to a threshold VSWR value, and detect whether each of the antennas is operable if an antenna of the antenna array has a VSWR value that is greater than or equal to the threshold VSWR value, and an adjuster configured to, if it is determined that at least one of the antennas is inoperable, adjust a beam pattern of at least one of the antennas that is operable.

In accordance with an aspect of the present invention, a beam pattern adjusting apparatus in a communication system supporting a BDMA scheme is provided. The beam pattern adjusting apparatus includes a processor configured to determine whether a VSWR value for each antenna included in an array antenna included in the beam pattern adjusting apparatus is greater than or equal to a threshold VSWR value, detect whether each of the antennas is operable if an antenna of the antenna array has a VSWR value is greater than or equal to the threshold VSWR value, and adjust a beam pattern if it is determined that at least one of the antennas is inoperable, adjust a beam pattern of at least one of the antennas that is operable.

BRIEF DESCRIPTION OF THE DRAWINGS

The above and other aspects, features, and advantages of certain embodiments of the present invention will be more apparent from the following detailed description taken in conjunction with the accompanying drawings, in which:

FIGS. 10A-10C are diagrams illustrating a process of determining whether antenna elements are operable in a communication system supporting a BDMA scheme, according to an embodiment of the present invention;

DETAILED DESCRIPTION OF EMBODIMENTS OF THE PRESENT INVENTION

Figure 1:
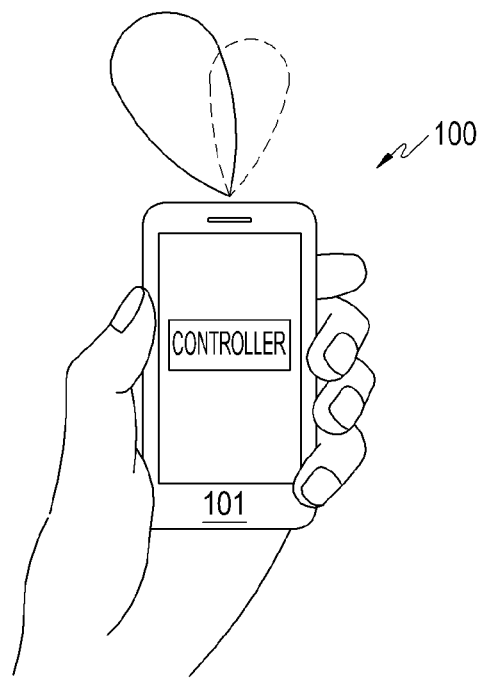
FIG. 1 is a diagram illustrating a beam pattern adjusting apparatus in a communication system supporting a BDMA scheme, according to an embodiment of the present invention.

Hereinafter, embodiments of the present invention are described in detail with reference to the accompanying drawings. Those of ordinary skill in the art will recognize that various changes and modifications of the embodiments described herein can be made without departing from the scope and spirit of the present invention. In addition, descriptions of well-known functions and constructions may be omitted for clarity and conciseness. The same reference symbols are used throughout the drawings to refer to the same or like parts.

It should be noted that various embodiments described below may be applied or used individually or in combination.

The terms and words used in the following description and claims are not limited to their dictionary meanings, but, are merely used to enable a clear and consistent understanding of the present invention. Accordingly, it should be apparent to those skilled in the art that the following description of various embodiments of the present invention is provided for illustrative purposes only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination thereof. It should be noted that the functionality associated with any particular controller may be centralized or distributed, whether locally or remotely. Definitions for certain words and phrases are provided throughout this specification. Those of ordinary skill in the art would understand that in many, if not most instances, such definitions apply to prior, as well as future uses of such defined words and phrases.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

Herein, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

The electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync®, Apple TV®, or Google TV®), a gaining console, an electronic dictionary, an electronic key, a camcorder, an electronic picture frame, and/or the like.

The electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

The electronic device may be furniture, part of a building/ structure, an electronic board, electronic signature receiving device, a projector, various measuring devices (e.g., water, electricity, gas or electro-magnetic wave measuring devices), and/or the like that include communication functionality.

The electronic device may be any combination of the foregoing devices. In addition, the electronic device is not limited to the foregoing devices.

A portable terminal may be the electronic device described herein.

Operation of a beam pattern adjusting apparatus in a communication system supporting a BDMA scheme, according to an embodiment of the present invention will be described with reference to FIG. 1.

FIG. 1 is a diagram illustrating a beam pattern adjusting apparatus in a communication system supporting a BDMA scheme, according to an embodiment of the present invention.

Referring to FIG. 1, it will be assumed that the beam pattern adjusting apparatus 100 is implemented in a portable terminal 101, and the portable terminal 100 includes an antenna array including at least two antenna elements. The portable terminal 100 is in contact with a user's body, e.g., a hand of a user, and the beam pattern adjusting apparatus may be impedance matched by considering an electromagnetic characteristic due to the user's body in a relatively high frequency band, e.g., a frequency band which is greater than or equal to 10 GHz.

An internal structure of the beam pattern adjusting apparatus 100 in a communication system supporting a BDMA scheme, according to an embodiment of the present invention, will be described with reference to FIG. 2.

Figure 2:
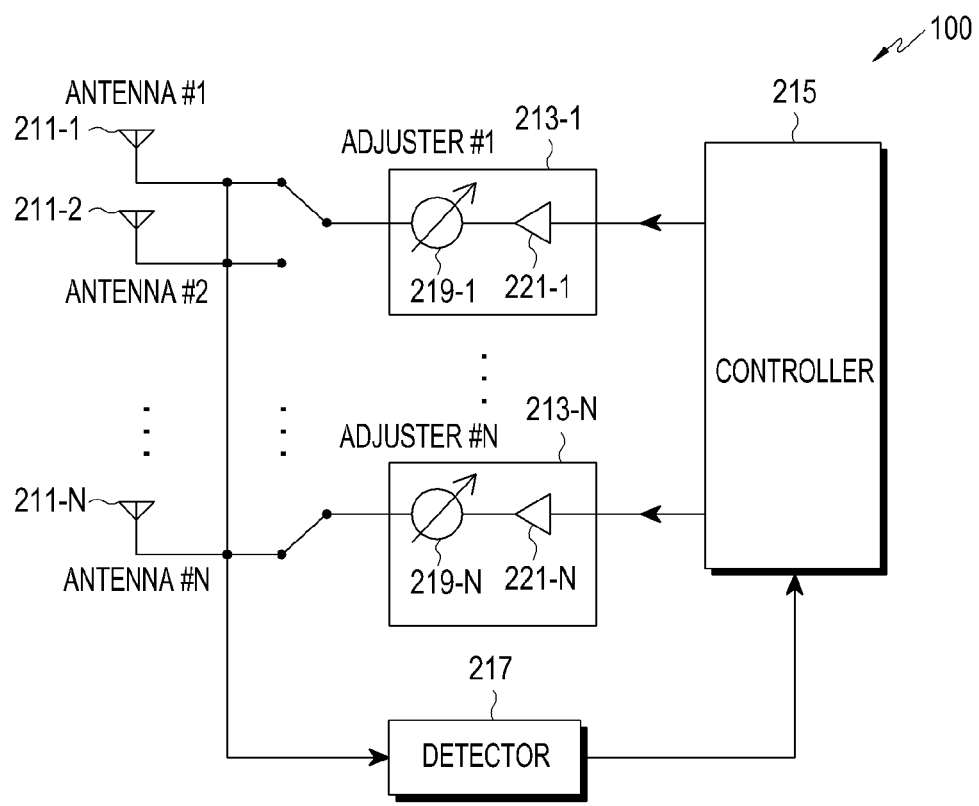
FIG. 2 is diagram illustrating an inner structure of a beam pattern adjusting apparatus in a communication system supporting a BDMA scheme, according to an embodiment of the present invention.

FIG. 2 is diagram illustrating an inner structure of a beam pattern adjusting apparatus in a communication system supporting a BDMA scheme, according to an embodiment of the present invention.

Referring to FIG. 2, the beam pattern adjusting apparatus 100 includes a plurality of antennas, e.g., N antennas, i.e., an antenna#1 211-1, an antenna#2 211-2, . . . , an antenna#N 211-N, and N adjusters, i.e., an adjuster#1 213-1, . . . , an adjuster#N 213-N which are connected to the N antennas, a controller 215, and a detector 217. The antenna#1 211-1, the antenna#2 211-2, . . . , the antenna#N 211-N are included in one antenna array. That is, each of the antenna#1 211-1, the antenna#2 211-2, . . . , the antenna#N 211-N is an antenna element included in the antenna array.

The controller 215 controls the overall operation of the beam pattern adjusting apparatus 100. More particularly, the controller 215 detects a degree in which a part of a user's body, such as a hand, a head, etc. is close to a specific antenna of the antenna array based on a VSWR signal, which is received from each of the N antennas, and determines whether the specific antenna is operating normally. The controller 215 detects a magnitude of a signal and a phase of a signal included in a VSWR signal for each of remaining antennas except for the specific antenna from among the N antennas. The controller 215 controls the overall operation of the beam pattern adjusting apparatus 100, which will be described in greater detail with reference to FIGS. 3-12.

The detector 217 detects a VSWR signal, which is reflected from each of the N antennas.

Each of the N adjusters includes an amplifier and a phase shifter. That is, the adjuster#1 213-1 includes a phase shifter#1 219-1 and an amplifier#1 221-1. In this way, the adjuster#N 213-N as the last adjuster includes a phase shifter#N 219-N and an amplifier#N 221-N.

While the antenna#1 211-1, the antenna#2 211-2, . . . , the antenna#N 211-N, the adjuster#1 213-1, . . . , the adjuster#N 213-N, the controller 215, and the detector 217 are described as separate units, it is to be understood that this is merely for convenience of description. In other words, two or more of the antenna#1 211-1, the antenna#2 211-2, . . . , the antenna#N 211-N, the adjuster#1 213-1, . . . , the adjuster#N 213-N, the controller 215, and the detector 217 may be incorporated into a single unit, such as on a System of Chip (SoC).

Further, the beam pattern adjusting apparatus 100 may be implemented as one processor.

A method of the beam pattern adjusting apparatus 100 in a communication system supporting a BDMA scheme, according to an embodiment of the present invention, will be described with reference to FIG. 3.

Figure 3:
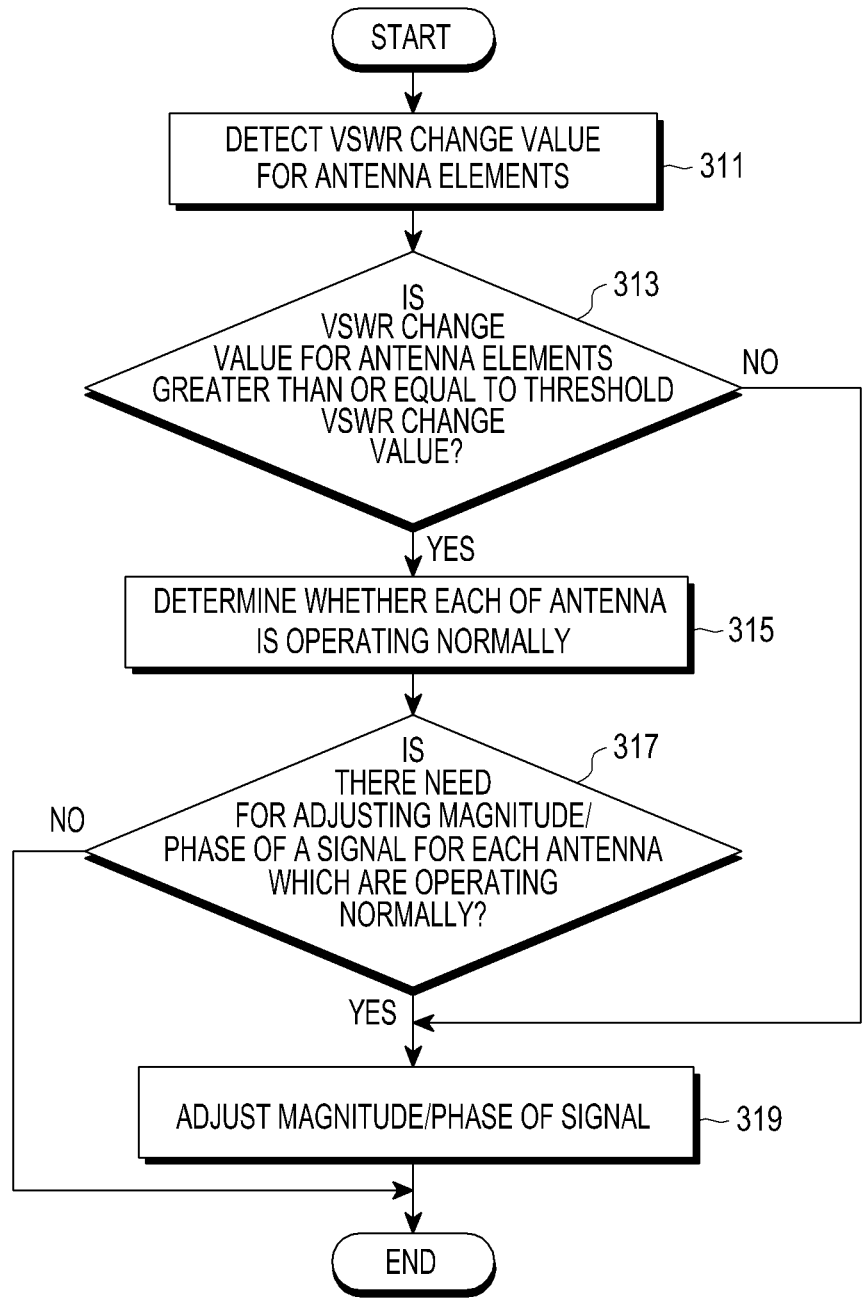
FIG. 3 is a flowchart illustrating a method of a beam pattern adjusting apparatus in a communication system supporting a BDMA scheme, according to an embodiment of the present invention.

FIG. 3 is a flowchart illustrating a method of the beam pattern adjusting apparatus 100 in a communication system supporting a BDMA scheme, according to an embodiment of the present invention.

Referring to FIG. 3, the beam pattern adjusting apparatus 100 detects a VSWR change value for each of the antennas included in the antenna array, at step 311. At step 311, the reason the VSWR change value for each of antenna elements is detected is that the beam pattern adjusting apparatus detects a degree in which an antenna of the antenna array is hidden, e.g., blocked or concealed by another object, such as a user's hand, based on the VSWR change value.

Generally, a degree in which a signal is reflected from an antenna, i.e., magnitude of a signal and a phase of the signal, which is reflected may be changed according to part of a user's body, an external factor which disturbs normal radiation of a beam, a distance, or a location (e.g., a degree in which an antenna is hidden). The beam pattern adjusting apparatus 100 detects which antenna from among the antennas included in the antenna array is affected by an external factor by detecting the VSWR change value for each of the antennas in the antenna array.

The beam pattern adjusting apparatus 100 determines whether the VSWR change value for each of the antennas is greater than or equal to a threshold VSWR change value, at step 313. The reason for determining whether the VSWR change value for each of the antenna elements is greater than or equal to the threshold VSWR change value is that the beam pattern adjusting apparatus detects a degree in which an antenna of the antenna array or the antenna array is hidden by an external factor. A situation in which an antenna is hidden will be described in greater detail with reference to FIGS. 4-9.

If the VSWR change value for each of the antennas is not greater than or equal to the threshold VSWR change value, that is, the VSWR change value for each of the antennas is less than the threshold VSWR change value, the beam pattern adjusting apparatus 100 proceeds to step 317. If the VSWR change value for each of the antennas is less than the threshold VSWR change value, an antenna hidden situation for the antenna array is not present.

If the VSWR change value for each of the antennas is greater than or equal to the threshold VSWR change value, the beam pattern adjusting apparatus 100 proceeds to step 315. If the VSWR change value for each of the antennas is greater than or equal to the threshold VSWR change value, it means that the antenna hidden situation for the antenna array is present. The beam pattern adjusting apparatus 100 determines whether each of the antennas is operating normally, and performs an operation corresponding to whether each of the antennas is operating normally at step 315. If at operation 315, the beam pattern adjusting apparatus 100 determines that an antenna of which a VSWR change value is greater than or equal to the threshold VSWR change value from among the antenna elements is not operating normally, the beam adjusting apparatus 100 stops running a related antenna, and selects another antenna from among the antenna array. That is, the beam pattern adjusting apparatus 100 replaces the related antenna, which is stopped, with the another antenna.

The beam pattern adjusting apparatus 100 determines whether there is a need for adjusting a magnitude/phase of a signal for each of the antennas, which are operating normally, at step 317. After completing step 315, the beam pattern adjusting apparatus 100 detects antennas which are operating normally, and adjusts a beam pattern using the antennas which are operating normally. That is, the beam pattern adjusting apparatus 100 adjusts a magnitude/phase of a signal based on location between antennas which are operating normally so that a beam pattern which is identical or most similar to a beam pattern, which the beam pattern adjusting apparatus 100 has already used, may be generated. The beam pattern adjusting apparatus 100 determines whether there is the need for adjusting the magnitude/phase of a signal for each of the antennas which are operating normally.

If there is no need for adjusting the magnitude/phase of a signal for each of the antennas, the beam pattern adjusting apparatus 100 stops operating. If there is the need for adjusting the magnitude/phase of a signal for each of the antennas, the beam pattern adjusting apparatus 100 adjusts the magnitude/phase of the signal for each of the antennas at step 319. The beam pattern adjusting apparatus 100 adjusts a magnitude of a signal for a related antenna by adjusting a set value of an amplifier included in an adjuster which is connected to the related antenna, and adjusts a phase of a signal for the related antenna element by adjusting a set value of a phase shifter included in the adjuster of the related antenna.

Although FIG. 3 illustrates a method of a beam pattern adjusting apparatus 100 in a communication system supporting a BDMA scheme, various changes to the method of to FIG. 3 could be made. For example, although shown as a series of operations, various operations in FIG. 3 could overlap, occur in parallel, occur in a different order, or occur multiple times.

An antenna hidden situation in a communication system supporting a BDMA scheme, according to an embodiment of the present invention, will be described with reference to FIG. 4.

Figure 4:
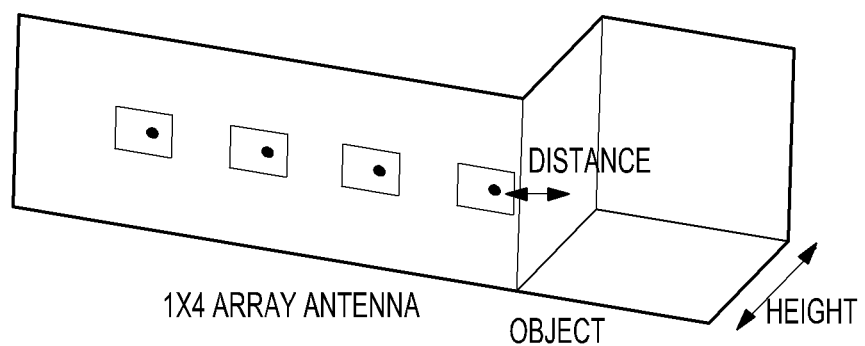
FIG. 4 is a diagram illustrating an antenna, which is hidden in a communication system supporting a BDMA scheme, according to an embodiment of the present invention.

FIG. 4 is a diagram illustrating an antenna hidden in a communication system supporting a BDMA scheme, according to an embodiment of the present invention.

Referring to FIG. 4, if an antenna is hidden by an object, e.g., a part of a user's body, this affects an S-parameter, i.e., a reflection coefficient S11. If a value of the reflection coefficient S11 is less than or equal to a preset threshold reflection coefficient value, e.g., 10 dB, antenna radiation efficiency for the antenna becomes decreased. So, if the antenna is hidden by the object, a value of the reflecting coefficient S11 becomes less than or equal to the preset threshold reflection coefficient value, i.e., 10 dB occurs.

Further, a situation in which an antenna is hidden may be detected according to a height and a distance of an object. For example, if a distance between an antenna and an object is shorter than about $0.05\lambda$, and a height of the object is higher than about $0.1\lambda$, the situation in which an antenna is hidden may be detected.

A value of a reflection coefficient according to an antenna hidden in a communication system supporting a BDMA scheme, according to an embodiment of the present invention, will be described with reference to FIG. 5.

Figure 5:
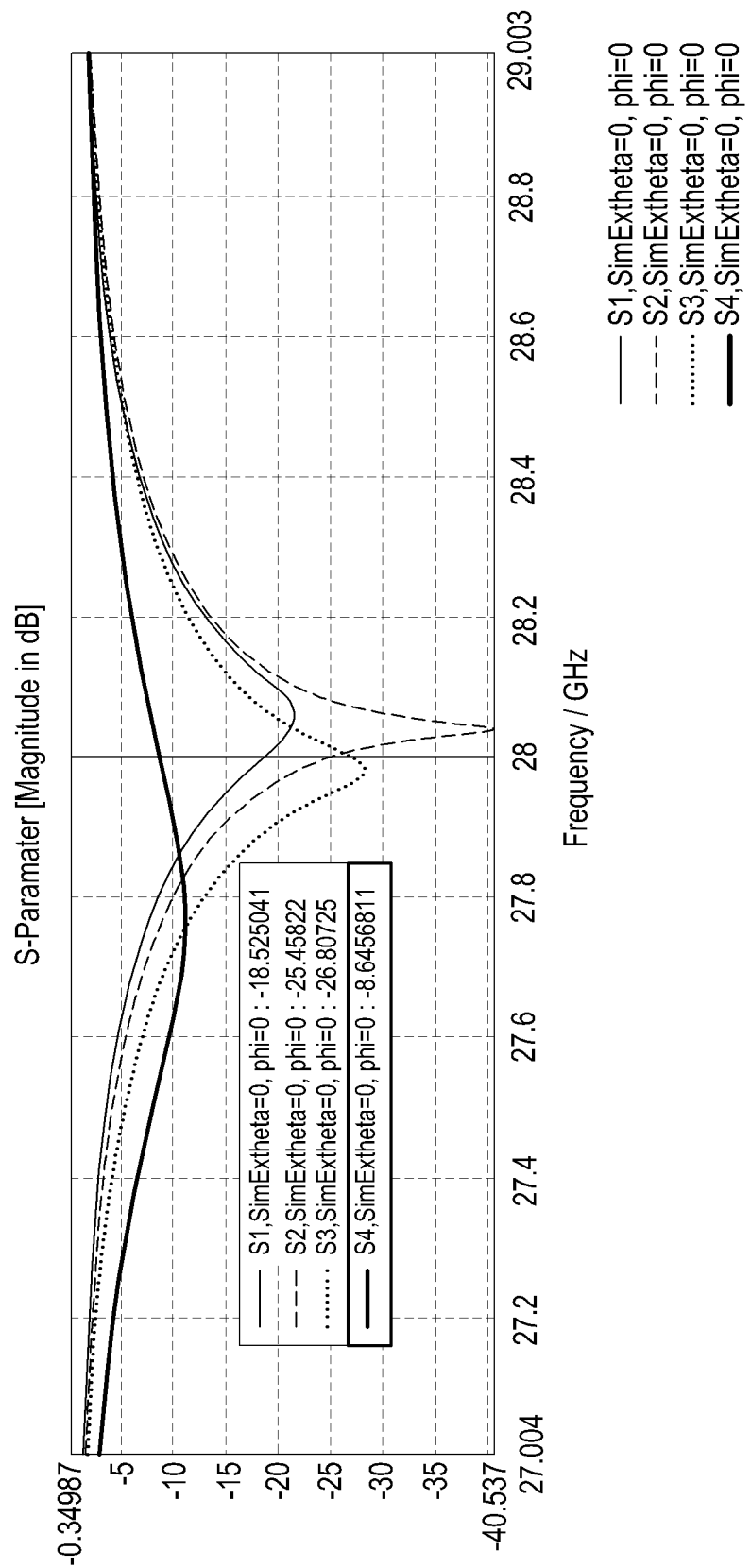
FIG. 5 is a graph illustrating a value of a reflection coefficient according to an antenna, which is hidden in a communication system supporting a BDMA scheme, according to an embodiment of the present invention.

FIG. 5 is a graph illustrating a value of a reflection coefficient according to an antenna, which is hidden in a communication system supporting a BDMA scheme, according to an embodiment of the present invention.

As shown in the graph of FIG. 5, a situation in which an antenna is hidden occurs if a value of a reflecting coefficient S11 becomes less than or equal to a specific value, e.g., 10 dB.

A value of a reflection coefficient according to a hidden antenna in a case that a 1×4 array antenna is used in a communication system supporting a BDMA scheme, according to an embodiment of the present invention, will be described with reference to FIGS. 6A and 6B.

Figures 6A, 6B:
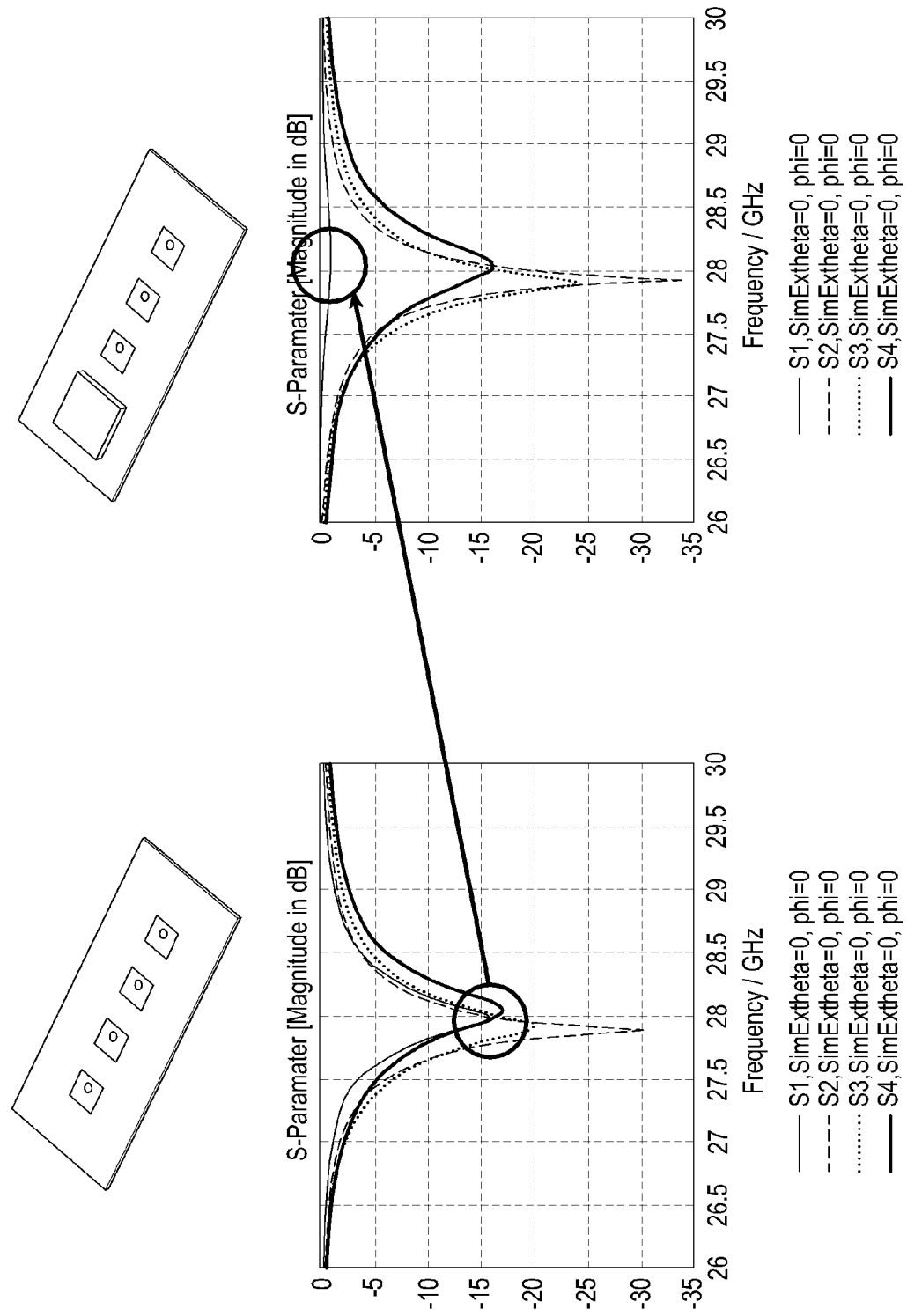
FIGS. 6A and 6B are graphs illustrating a value of a reflection coefficient according to an antenna, which is hidden, and includes a 1×4 antenna array, in a communication system supporting a BDMA scheme, according to an embodiment of the present invention.

FIGS. 6A and 6B are graphs illustrating a value of a reflection coefficient according to an antenna, which is hidden, and includes a 1×4 antenna array, in a communication system supporting a BDMA scheme, according to an embodiment of the present invention.

Referring to FIGS. 6A and 6B, the reflection coefficient value graphs corresponds to an instance where a portable terminal includes a 1×4 antenna array.

In FIG. 6A, the reflection coefficient value graph corresponds to an instance where none of the four antennas included in the 1×4 antenna array are hidden.

In FIG. 6B, the reflection coefficient value graph corresponds to an instance where a single antenna among the four antennas included in the 1×4 antenna array is hidden.

As illustrated in FIGS. 6A and 6B, an S parameter, i.e., a reflection coefficient value changes when the antenna transitions from the unhidden state to the hidden state. That is, a magnitude, in dBs, of the S parameter of an antenna decreases when the antenna transitions from the unhidden state to the hidden state.

A value of a reflection coefficient according to a distance between an antenna array and a part of a user's body in a communication system supporting a BDMA scheme, according to an embodiment of the present invention, will be described with reference to FIGS. 7A and 7B.

Figure 7B:
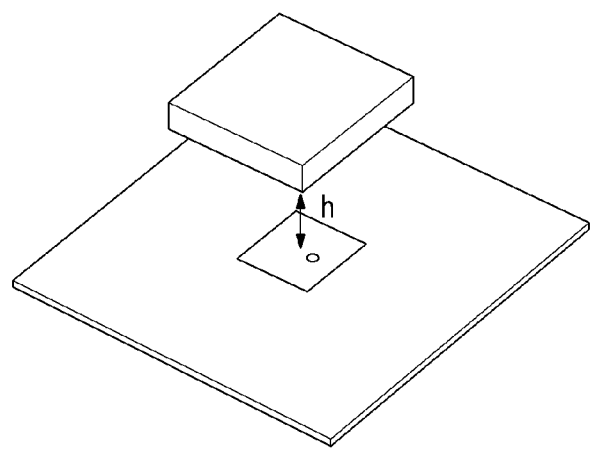
FIG. 7A is a graph illustrating a value of a reflection coefficient according to a distance between an antenna array and a user's body, shown schematically in FIG. 7B, in a communication system supporting a BDMA scheme, according to an embodiment of the present invention.
Figure 7A:
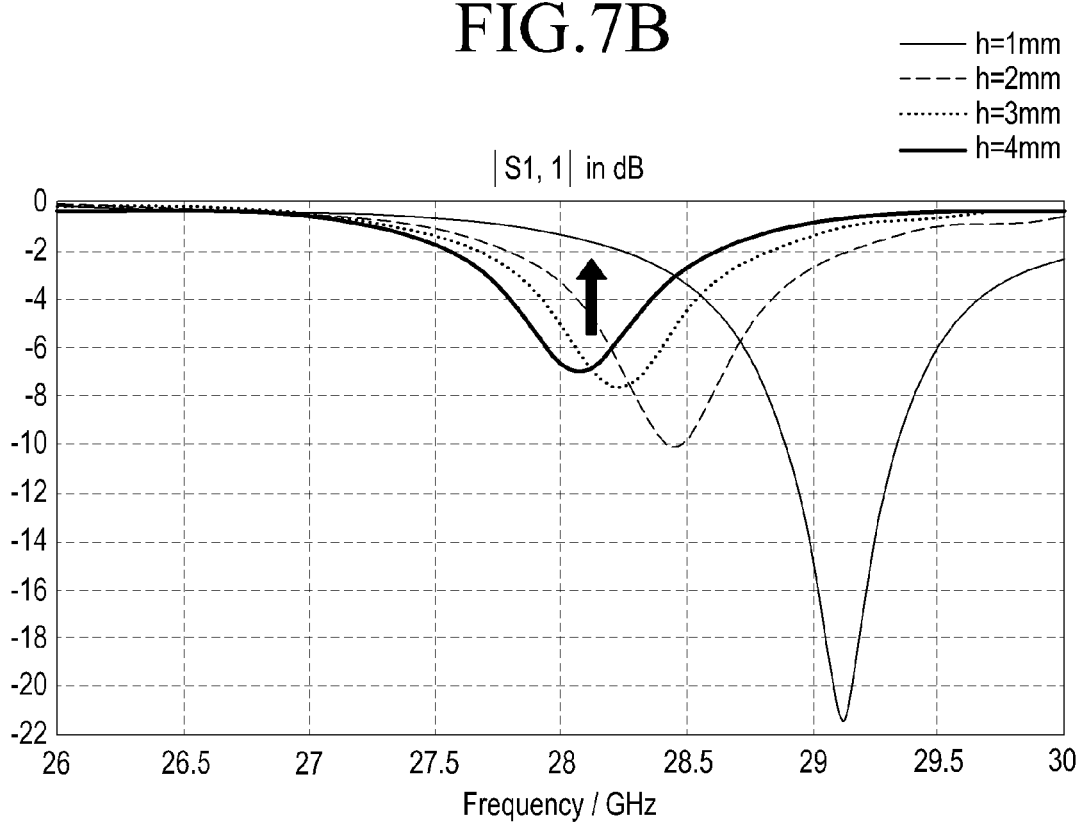

FIG. 7A is a graph illustrating a value of a reflection coefficient according to a distance between an antenna array and a user's body, shown schematically in FIG. 7B, in a communication system supporting a BDMA scheme, according to an embodiment of the present invention.

FIG. 7A indicates a value of a reflection coefficient according to a distance between a portable terminal and part of a user's body. In FIG. 7B, h is a parameter for indicating the distance between the portable terminal and the part of a user's body, and it will be understood that a value of a reflection coefficient is changed according to a value of the h. That is, as the distance h between the part of a user's body and the antenna increases, a value of the reflection coefficient increases. Similarly, as the distance h between the part of a user's body and the antenna decreases, a value of the reflection coefficient decreases.

A value of a reflection coefficient according to a degree in which an array antenna is hidden in a communication system supporting a BDMA scheme, according to an embodiment of the present invention, will be described with reference to FIGS. 8A and 8B.

Figure 8B:
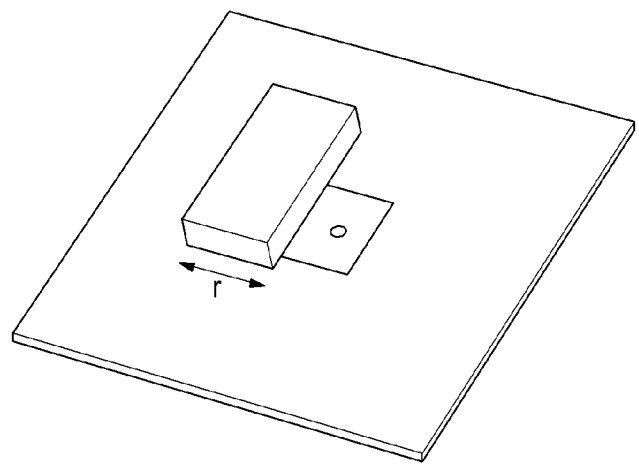
FIG. 8A is a graph illustrating a value of a reflection coefficient according to a degree in which an antenna array is hidden, shown schematically in FIG. 8B, in a communication system supporting a BDMA scheme, according to an embodiment of the present invention.
Figure 8A:
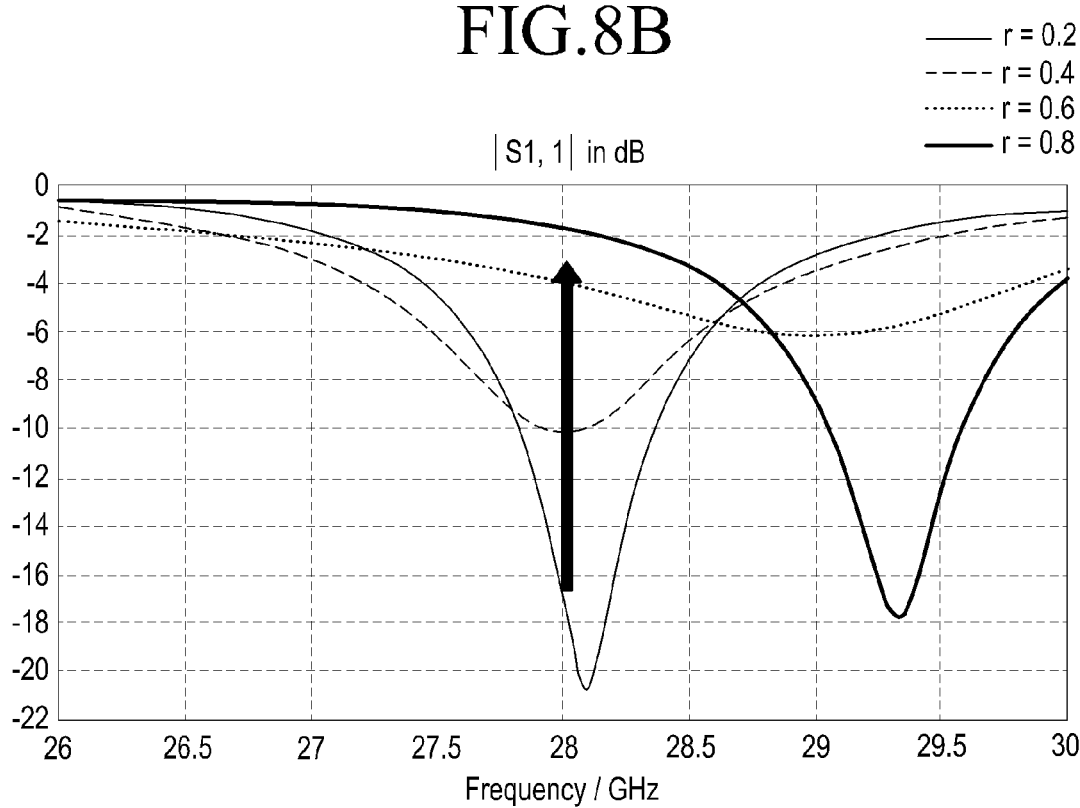

FIG. 8A is a graph illustrating a value of a reflection coefficient according to a degree in which an antenna array is hidden, shown schematically in FIG. 8B, in a communication system supporting a BDMA scheme, according to an embodiment of the present invention.

FIG. 8A indicates a value of a reflection coefficient according to a degree in which an antenna array is hidden. In FIG. 8B, r is a parameter for indicating a degree in which an antenna array is hidden, and it will be understood that a value of a reflection coefficient is changed according to a value of the r. That is, as the antenna array becomes more hidden, a value of the reflection coefficient will decrease. Conversely, as the antenna array becomes less hidden, a value of the reflection coefficient will increase.

A change of a beam pattern according to a degree in which an antenna array is hidden in a communication system supporting a BDMA scheme, according to an embodiment of the present invention, will be described with reference to FIG. 9.

Figure 9:
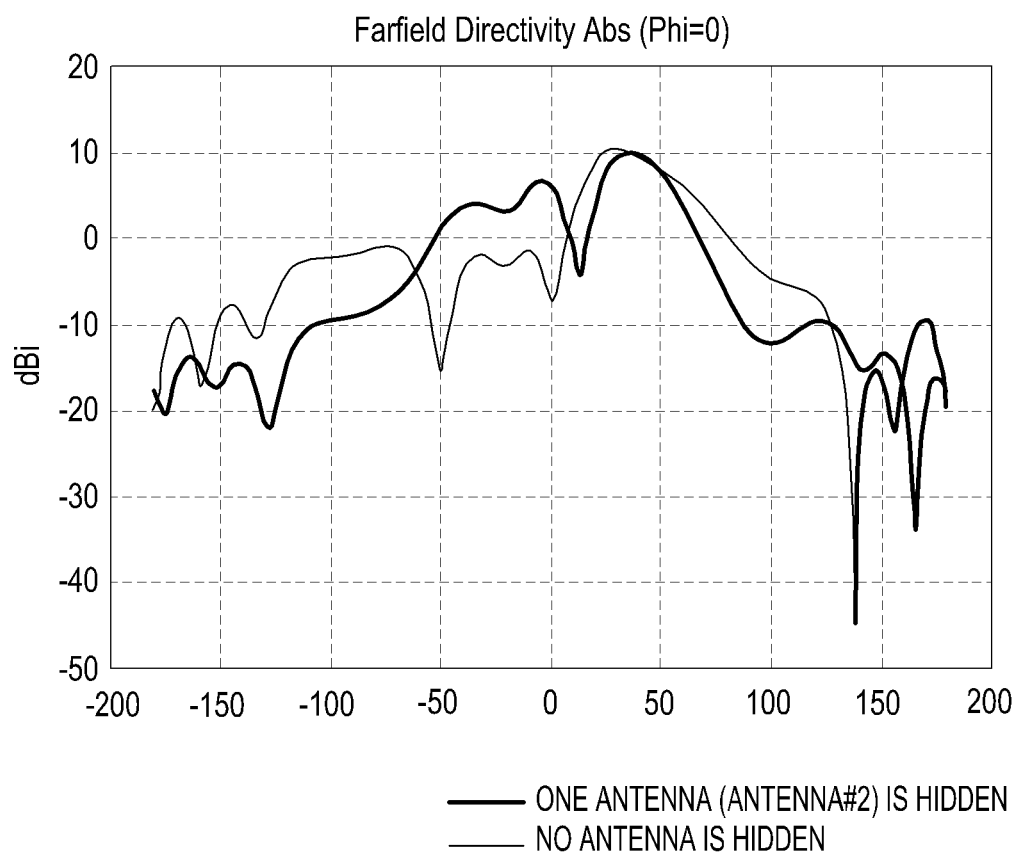
FIG. 9 is a graph illustrating a change of a beam pattern according to a degree in which an array antenna is hidden in a communication system supporting a BDMA scheme, according to an embodiment of the present invention.

FIG. 9 is a graph illustrating a change of a beam pattern according to a degree in which an array antenna is hidden in a communication system supporting a BDMA scheme, according to an embodiment of the present invention.

FIG. 9 indicates a change of a beam pattern in an instance where a 1×4 array antenna is used in the communication system supporting the BDMA scheme, an antenna element#2 from among four antennas included in the 1×4 antenna array is completely hidden by an external factor, and a beam direction is 30° in a θ direction.

As illustrated in FIG. 9, it will be understood that distortion which is greater than or equal to 10° occurs in a main beam and a side lobe increases, according to a degree in which an antenna is hidden. If the side lobe increases, this results in an increase of interference.

Further, a change of a beam pattern increases according to a number of antennas which are hidden by an external factor, e.g., a part of a user's body, from among antennas included in an antenna array or a location of the antennas which are hidden by the external factor.

A process of determining whether antennas are operable in a communication system supporting a BDMA scheme, according to an embodiment of the present invention, will be described with reference to FIG. 10.

FIGS. 10A-10C are diagrams illustrating a process of determining whether antenna elements are operable in a communication system supporting a BDMA scheme, according to an embodiment of the present invention.

Referring to FIGS. 10A-10C, it will be assumed that four Radio Frequency (RF) chains in the beam pattern adjusting apparatus 100 form a beam using eight antennas, i.e., an antenna element#1, an antenna element#1", an antenna element#2, an antenna element#2", an antenna element#3, an antenna element#3", an antenna element#4, and an antenna element#4".

While using four antennas from among the eight antennas, i.e., the antenna element#1, the antenna element#2, the antenna element#3, and the antenna element#4 (FIG. 10A), the beam pattern adjusting apparatus 100 detects that the antenna element#1, the antenna element#1", the antenna element#2, and the antenna element#4" are unable to operate due to an external factor, e.g., a body part of a user, (FIG. 10B). In this instance, the beam pattern adjusting apparatus 100 detects the remaining operable antennas and selects the antenna element#2" and the antenna element#3", and stops an operation of the antenna element#1 (FIG. 10C).

An example of a process of recovering a beam using antennas which are operating normally in a communication system supporting a BDMA scheme, according to an embodiment of the present invention, will be described with reference to FIG. 11.

Figure 11:
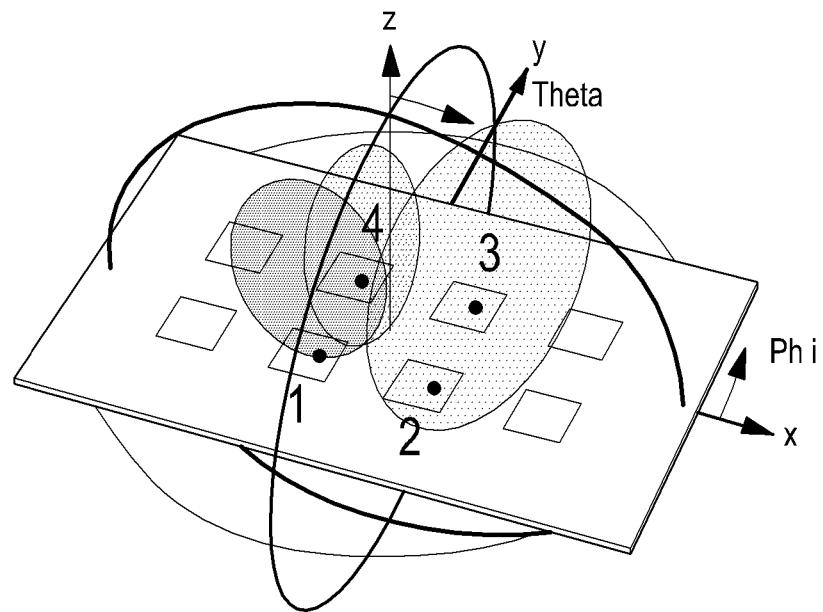
FIG. 11 is a graph illustrating an example of a method of recovering a beam using antenna elements which are operating normally in a communication system supporting a BDMA scheme, according to an embodiment of the present invention.

FIG. 11 is a graph illustrating an example of a method of recovering a beam using antenna elements which are operating normally in a communication system supporting a BDMA scheme, according to an embodiment of the present invention.

Referring to FIG. 11, if the beam pattern adjusting apparatus 100 is having difficulty using all of its RF chains, that is, the beam pattern adjusting apparatus 100 is only using some RF chains, the beam pattern adjusting apparatus 100 may amplify or attenuate a signal for some RF chains to maintain gain or inhibit a side lobe.

A change of a phase delay value according to a condition that an antenna is operating, in a case where the beam pattern adjusting apparatus 100 is able to use all of its RF chains and a beam direction is 30° in a θ direction, is illustrated in FIG. 11. That is, in FIG. 11, it will be understood that an RF chain#1 has phase delay of 0°, an RF chain#2 has phase delay of −90.11°, an RF chain#3 has phase delay of −90.11°, and an RF chain#4 has phase delay of 0°.

Another example of a process of recovering a beam using antenna elements which are operating normally in a communication system supporting a BDMA scheme, according to an embodiment of the present invention, will be described with reference to FIG. 12.

Figure 12:
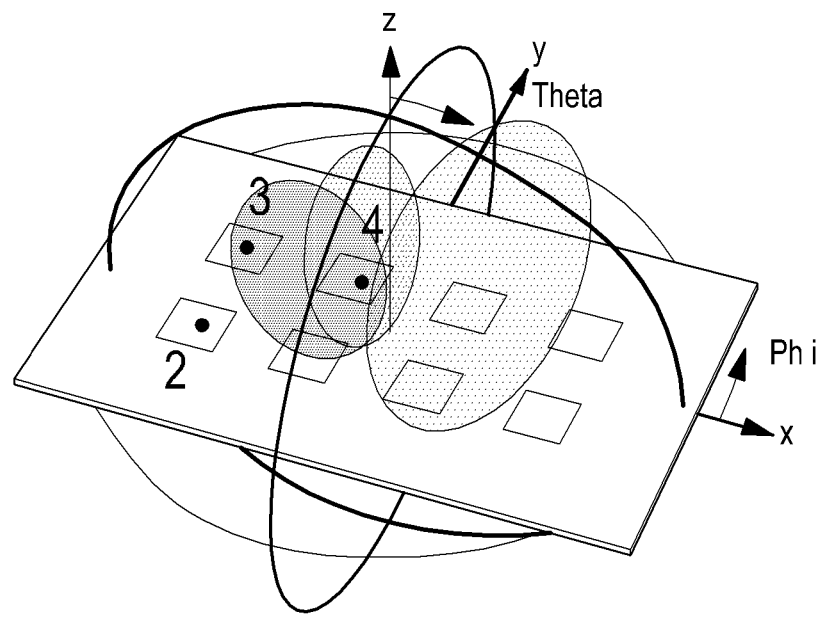
FIG. 12 is a diagram illustrating another example of a method of recovering a beam using antenna elements which are operating normally in a communication system supporting a BDMA scheme, according to an embodiment of the present invention.

FIG. 12 is a diagram illustrating another example of a method of recovering a beam using antenna elements which are operating normally in a communication system supporting a BDMA scheme, according to an embodiment of the present invention.

Referring to FIG. 12, if the beam pattern adjusting apparatus 100 is having difficulty using all of its RF chains, that is, the beam pattern adjusting apparatus 10 is only using some of its RF chains, the beam pattern adjusting apparatus 100 may amplify or attenuate a signal for the some RF chains to maintain gain or inhibit a side lobe.

A change of a phase delay value according to a condition that an antenna is operating, in a case where the beam pattern adjusting apparatus 100 is unable to use all of its RF chains, that is, the beam pattern adjusting apparatus 100 is able to use an RF chain#2, an RF chain#3, and an RF chain#4 from among 4 an RF chains, and a beam direction is 30° in a θ direction, is illustrated in FIG. 12. That is, in FIG. 12, it will be understood that the RF chain#2 has phase delay of 90.11°, the RF chain#3 has phase delay of 90.11°, and the RF chain#4 has phase delay of 0°.

As described above, the beam pattern adjusting apparatus 100 is effective in various antenna array environments such as a BDMA scheme.

When using the beam pattern adjusting apparatus 100 in a BDMA scheme, it is relatively easy to detect an effect that a part of a user's body has on an antenna array included in a portable terminal, thereby obtaining the best performance from the antenna array.

Further, as discussed above, it is possible to implement a portable terminal including an array antenna using RF chains. Here, the number of the RF chains is less than the number of antenna elements.

When an operation of an antenna is impossible due to an external factor occurs, it is possible to operate a phase antenna array using remaining antennas that are not affected by the external factor.

In an environment that a signal transmitting/receiving operation is not being performed normally, e.g., a mobile environment, it is possible to detect an antenna failure.

In a communication environment between users using a millimeter (mm) Wave antenna array, antenna failure, which may occur due to a user's human body, may be avoided.

The present invention may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present invention can be easily construed by programmers skilled in the art to which the present invention pertains.

It can be appreciated that a method and apparatus according to an embodiment of the present invention may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present invention may be implemented by a computer or a mobile terminal that includes a controller and a memory, and the memory may be an example of a non-transitory machine-readable (e.g., computer-readable), storage medium suitable to store a program or programs including instructions for implementing various embodiments of the present invention.

The present invention may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present invention may include their equivalents.

An apparatus according to an embodiment of the present invention may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present invention has been shown and described with reference to certain embodiments thereof, it should be understood by those skilled in the art that many variations and modifications of the method and apparatus described herein will still fall within the spirit and scope of the present invention as defined in the appended claims and their equivalents.

What is claimed is:

1. A method for adjusting a beam pattern in a beam pattern adjusting apparatus in a communication system supporting a beam division multiple access (BDMA) scheme, the method comprising:

determining whether a voltage standing wave ratio (VSWR) value for each of antennas included in an antenna array included in the beam pattern adjusting apparatus is greater than or equal to a threshold VSWR value;

upon detecting that at least one of the antennas has a VSWR value that is greater than or equal to the threshold VSWR, detecting whether each of the antennas is operable; and upon detecting that at least one of the antennas is operable, adjusting a beam pattern of the at least one antenna that is operable.

2. The method of claim 1, wherein adjusting of the beam pattern comprises:

determining whether there is a need for adjusting one of a magnitude and a phase for each of the antennas that is operable; and adjusting one of the magnitude and phase for each of the antennas that is operable.

3. The method of claim 1, wherein detecting whether each of the antennas is operable comprises determining that the antenna of which the VSWR value is greater than or equal to the threshold VSWR value is inoperable.

4. The method of claim 3, further comprising:

upon detecting that at least one of the antennas is inoperable, replacing the at least one antenna that is inoperable with the at least one antenna which is operable.

5. The method of claim 1, wherein a VSWR value, for a related antenna, that is greater than or equal to the threshold VSWR value indicates that a hidden state occurs at the related antenna.

6. The method of claim 5, wherein the hidden state denotes a state that a reflecting coefficient value for the related antenna is less than or equal to a preset threshold reflecting coefficient value.

7. A beam pattern adjusting apparatus in a communication system supporting a beam division multiple access (BDMA) scheme, the beam pattern adjusting apparatus comprising:

a controller configured to determine whether a voltage standing wave ratio (VSWR) value for each of antennas included in an antenna array included in the beam pattern adjusting apparatus is greater than or equal to a threshold VSWR value, and detect whether each of the antennas is operable upon detecting that at least one of the antennas has a VSWR value that is greater than or equal to the threshold VSWR value; and an adjuster configured to adjust a beam pattern of at least one of the antennas that is operable upon detecting that at least one of the antennas is operable.

8. The beam pattern adjusting apparatus of claim 7, wherein the controller determines whether there is a need for adjusting one of a magnitude and a phase for each of the antennas that is operable, and controls the adjuster to adjust one of the magnitude and phase for each of the antennas that is operable.

9. The beam pattern adjusting apparatus of claim 7, wherein the controller determines that the antenna of which the VSWR value is greater than or equal to the threshold VSWR value is inoperable.

10. The beam pattern adjusting apparatus of claim 9, wherein the controller replaces at least one of the antennas that is inoperable with the at least one antenna which is operable upon detecting that at least one of the antennas is inoperable.

11. The beam pattern adjusting apparatus of claim 7, wherein a VSWR value, for a related antenna, that is greater than or equal to the threshold VSWR value indicates that a hidden state occurs at the related antenna.

12. The beam pattern adjusting apparatus of claim 11, wherein the hidden state denotes a state that a reflecting coefficient value for the related antenna is less than or equal to a preset threshold reflecting coefficient value.

13. The beam pattern adjusting apparatus of claim 7, wherein the adjuster comprises:

an amplifier; and a phase shifter.

14. The beam pattern adjusting apparatus of claim 7, further comprising:

a detector configured to detect a VSWR value for each of the antennas included in the antenna array.

15. A beam pattern adjusting apparatus in a communication system supporting a beam division multiple access (BDMA) scheme, the beam pattern adjusting apparatus comprising:

a processor configured to determine whether a voltage standing wave ratio (VSWR) value for each of antennas included in an antenna array included in the beam pattern adjusting apparatus is greater than or equal to a threshold VSWR value, detect whether each of the antennas is operable upon detecting that at least one of the antennas has a VSWR value that is greater than or equal to the threshold VSWR value, and adjust a beam pattern of at least one of the antennas that is operable upon detecting that at least one of the antennas is operable.

16. The beam pattern adjusting apparatus of claim 15, wherein the processor determines whether there is a need for adjusting one of a magnitude and a phase for each of the antennas that is operable, and adjusts one of the magnitude and phase for each of the antennas that is operable.

17. The beam pattern adjusting apparatus of claim 15, wherein the processor determines that the antenna of which the VSWR value is greater than or equal to the threshold VSWR value is inoperable.

18. The beam pattern adjusting apparatus of claim 17, wherein the processor replaces at least one of the antennas that is inoperable with the at least one antenna which is operable upon detecting that at least one of the antennas is inoperable.

19. The beam pattern adjusting apparatus of claim 15, wherein a VSWR value, for a related antenna, that is greater than or equal to the threshold VSWR value indicates that a hidden state occurs at the related antenna.

20. The beam pattern adjusting apparatus of claim 19, wherein the hidden state denotes a state that a reflecting coefficient value for the related antenna is less than or equal to a preset threshold reflecting coefficient value.

* * * * *